US008418146B2

(12) United States Patent
Musuvathi et al.

(10) Patent No.: US 8,418,146 B2
(45) Date of Patent: Apr. 9, 2013

(54) SAMPLING TECHNIQUES FOR DYNAMIC DATA-RACE DETECTION

(75) Inventors: Madanlal Musuvathi, Redmond, WA (US); Daniel Marino, West Hollywood, CA (US); Satish Narayanasamy, Ann Arbor, MI (US)

(73) Assignee: Microsoft Corporation, Redmond, WA (US)

( * ) Notice: Subject to any disclaimer, the term of this patent is extended or adjusted under 35 U.S.C. 154(b) by 1155 days.

(21) Appl. No.: 12/324,290

(22) Filed: Nov. 26, 2008

(65) Prior Publication Data

US 2010/0131931 A1 May 27, 2010

(51) Int. Cl.
*G06F 9/44* (2006.01)

(52) U.S. Cl.
USPC ............................................... 717/128

(58) Field of Classification Search .................. None
See application file for complete search history.

(56) References Cited

U.S. PATENT DOCUMENTS

| | | | |
|---|---|---|---|
| 6,202,127 B1 | 3/2001 | Dean et al. | |
| 7,366,956 B2 * | 4/2008 | Karp et al. | 714/38.14 |
| 2005/0091645 A1 * | 4/2005 | Chilimbi et al. | 717/130 |
| 2005/0216798 A1 * | 9/2005 | Yu | 714/718 |
| 2006/0282476 A1 | 12/2006 | Dolby et al. | |
| 2007/0245312 A1 | 10/2007 | Qadeer et al. | |
| 2008/0098207 A1 * | 4/2008 | Reid et al. | 712/227 |
| 2010/0050161 A1 * | 2/2010 | Nir-Buchbinder et al. | 717/126 |

OTHER PUBLICATIONS

Chilimbi, et al., "Low-Overhead Memory Leak Detection Using Adaptive Statistical Profiling", retrieved on Sep. 18, 2008 at <<http://www-plan.cs.colorado.edu/hauswirt/Research/asplos04.pdf, ASPLOS'04, Oct. 9-13, 2004, ACM, 2004, pp. 156-164.
Domeika, et al., "Optimization Techniques for Intel Multi-Core Processors", retrieved Sep. 18, 2008 at <<http://softwarecommunity.intel.com/articles/eng/2674.htm>>, May 25, 2007, pp. 1-6.
Fei, et al., "Artemis: Practical Runtime Monitoring of Applications for Errors" retrieved on Sep. 18, 2008 at <<http://docs.lib.purdue.edu/cgi/viewcontent.cgi?article=1003&context=ecetr>>, Electrical and Computer Engineering, ECE Technical Reports, Purdue Libraries, 2005, pp. i-iii and 1-27.
GradTurkey, "Eraser: A Dynamic Data Race Detector for Multithreaded Programs/BoAdler", retrieved on Sep. 18, 2008 at <<http://www.gradturkey.com/wiki/Eraser:_A_Dynamic_Data_Race_Detector_for_Multithreaded_Programs/BoAdler>>, Jun. 18, 2006, p. 1.
Liblit, et al., "Bug Isolation via Remote Program Sampling", retrieved on Sep. 18, 2008 at <<http://pages.cs.wisc.edu/~liblit/pldi-2003/pldi-2003.pdf>>, PLDI'03, Jun. 9-11, 2003, ACM, 2003, 14 pages.
O'Callahan, et al., "Hybrid Dynamic Data Race Detection", retrieved on Sep. 18, 2008 at <<http://www.cse.msu.edu/~cse914/Readings/hybridDynamicRaceDetection-ppopp03.pdf>>, PPoPP'03, Jun. 11-13, 2003, ACM, 2003, pp. 167-178.

* cited by examiner

*Primary Examiner* — Philip Wang
(74) *Attorney, Agent, or Firm* — Lee & Hayes, PLLC

(57) ABSTRACT

This document describes a dynamic data race detector that utilizes adaptive sampling techniques. The adaptive sampling techniques include locating threads during execution of a multi-threaded program and identifying thread-specific hot paths, thread-specific cold paths and lockset paths during execution of the program. Once these paths are identified, they are sampled, potentially at different rates. Any information gained during the sampling may be stored in a data race log, which a developer may use to correct any identified program bugs.

18 Claims, 5 Drawing Sheets

SAMPLING TECHNIQUES FOR DYNAMIC DATA-RACE DETECTION

BACKGROUND

Multi-threaded programs are difficult to understand and debug since the programmers have to deal with multiple flows of control. One common form of bug in a shared-memory, multi-threaded program is the data race. Data races in multi-threaded programs result from unsynchronized access to shared data and are good indications of computer program errors or bugs. Traditional methods to detect and debug the programs include both static and dynamic techniques. However, these traditional methods have several limitations.

Static techniques typically analyze the source code while the program is not running. While static techniques are accurate since they find all the potential data races in a program, static techniques have some critical limitations. Static techniques are not scalable to large code bases and they tend to make conservative assumptions that lead to the reporting of a large number of false data races. That is, static techniques often report a large number of data races that, in actuality, present no problems to the execution of the program. Consequently, static techniques are not frequently used since they place a tremendous burden on the developer to track down the true data races, as well as on the computational resources since many false data races are found in addition to the true data races.

Dynamic techniques, on the other hand, search for data races while the program is running. Unlike static techniques, dynamic techniques are scalable to applications with large code bases and are more precise than static tools since they analyze an actual execution of a program. However, traditional dynamic techniques also have several limitations.

The primary limitation is its run-time overhead, as dynamic tools analyze every memory operation executed by a multi-threaded program. Thus, using dynamic tools requires a significant number of computing resources since the program is running and constantly executing code and accessing memory. This increases cost, complexity and time. These dynamic data race detectors for managed code have been able to utilize some built-in synergies since the cost of maintaining meta-data for the objects in a runtime system are utilized in a managed code environment. However, for unmanaged code such as C and C++, the runtime performance and associated costs continues to remain very high.

Another limitation of dynamic data-race detectors is the lower coverage of data races due to the fact that a dynamic analysis only examines the dynamic path of one execution of the program, which provides less than 100% coverage. In order to get 100% coverage, multiple tests must be conducted which in turn requires more resources.

Consequently, a need exists for a data race detector which detects a satisfactory number of true data races while significantly reducing the amount of resources required in terms of equipment, personnel and time.

SUMMARY

This document describes a dynamic data race detector that utilizes an adaptive sampling technique. The adaptive sampling technique includes locating threads during execution of a multi-threaded program and identifying thread-specific hot paths, thread-specific cold paths and lockset paths during execution of the program. Once these paths are identified, they are sampled and a data race log is generated for a developer to use for correction.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE CONTENTS

The detailed description is described with reference to accompanying figures. In the figures, the left-most digit(s) of a reference number identifies the figure in which the reference number first appears. The use of the same reference numbers in different figures indicates similar or identical items.

DETAILED DESCRIPTION

Overview

This document describes a dynamic data-race detector utilizing an adaptive sampling technique which identifies those memory operations that are likely to be involved in a data race. The data race detector may then analyze different memory operations at different sampling rates based on this identification. In this manner, the focus may be placed on developing sampling techniques to dynamically identify portions of a program's execution that are likely to have a concurrency bug and pay the cost of dynamic analysis primarily for that portion of a program's execution. The end result will be a data-race log that consists of the time of all the synchronization operations and the sampled memory operations primarily for those identified portions of the program's execution and not for every thread as is typically performed. The developer or tester may then obtain a data-race log that took significantly less resources to generate. Furthermore, because there will be fewer log entries for which the developer will have to expend resources to analyze and correct, the developer may expend significantly less resources to correct the bugs in the threads.

Illustrative Architecture

Figure 1:
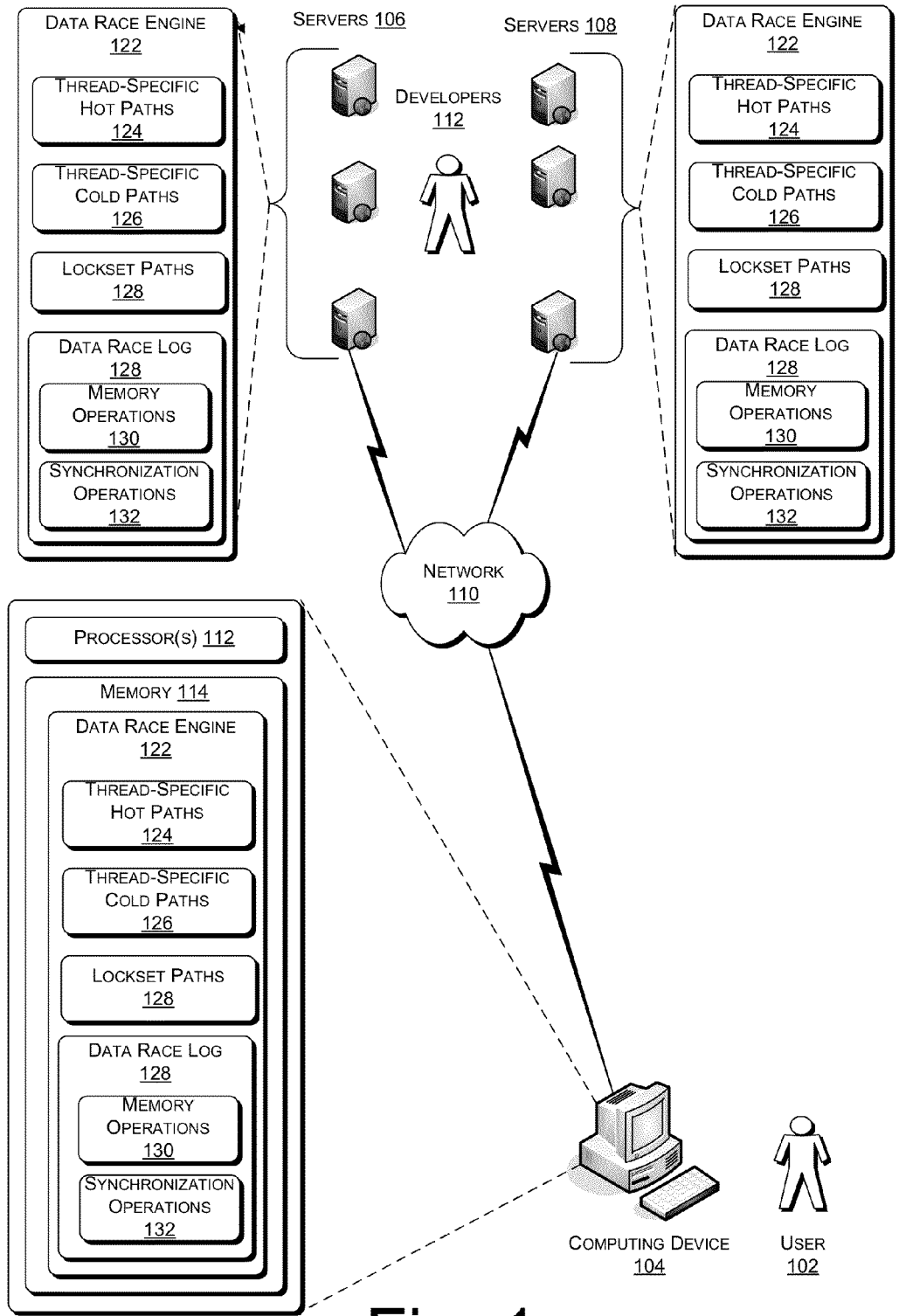
FIG. 1 depicts an illustrative architecture for a dynamic data-race detector using adaptive sampling techniques.

FIG. 1 depicts an illustrative architecture 100 that may employ the described dynamic data-race detector using adaptive sampling techniques. As illustrated, FIG. 1 includes a user 102 operating a computing device 104. FIG. 1 illustrates computing device 104 as a personal computer, although other embodiments may employ laptop computers and the like. The user may also operate servers 106 and 108 through a network 110.

As illustrated, computing device 104 contains processors 112 and memory 114. Memory 114 may contain data race engine 122. Data race engine 122 dynamically detects data races by sampling different threads at different rates. For instance, it may determine hot paths, cold paths and lockset paths, and then sample each of these paths at different rates. In FIG. 1, the data race engine 122 identifies and analyzes thread-specific hot paths 124, thread-specific cold paths 126 and lockset paths 128 for detection of data-races that may indicate bugs in the program. The use of hot and cold paths for each thread of the program is unique. Different threads within a program will have different sampling rates and a hot path for one thread may be a cold path for another thread and vice versa.

Different definitions may be used for what determines a hot path and what determines a cold path depending on the resources available and the accuracy desired. In one embodiment, when a particular thread is accessed more than 10 times, it may be deemed a hot path. Conversely, when a particular thread is accessed less than 10 times, it may be deemed a cold path. As the thread is continually accessed, it is possible that a cold path will become a hot path during continued execution of the program.

Lockset paths, meanwhile, occur when a different set of locks is used to access the same code or thread. For instance, the code for two different sets of locks may call for access to a web page. However, one set of locks is for refresh and one set of locks is for a button. In this case, the same code is being accessed, but a different set of locks is being used. This increases the likelihood of a potential bug and sampling rates are adjusted to reflect that likelihood. A data race log 130 records memory operations 132 and synchronization operations 134 from analysis of the thread-specific hot paths 124, thread-specific cold paths 126 and lockset paths 128.

Every thread generates a data race log entry. The data race log entry for a thread consists of a sequence of synchronization and memory operations executed by the thread. The synchronization operation 134 records a global timestamp. This information provides the offline data race detector a total chronological order between all the synchronization operations executed across all the threads. Given that synchronization operations are relatively infrequent in a program's execution and their baseline performance cost is already high, the instrumentation and logging overhead for synchronization operations is typically low.

The memory operation 132, meanwhile, records the memory accessed during the execution of the thread and records the program counter of the memory operation as well as its effective address. Since a thread would log the memory operations and the synchronization operations in a thread local log, the offline data race detector would be able to determine the time for the memory operation as well.

Unlike logging synchronization operations, logging memory operations can be quite high. There are two costs associated with logging a memory operation. One is the cost of executing instrumentation code and the other is the log size space overhead. It would be clearly prohibitive to pay these costs for each dynamic memory operation, as there can be over 100 million memory operations executed per second. The dynamic sampler described herein addresses this problem.

A data race log 130 may then be generated by computing device 104 by recording each data race log entry for each thread and may be transmitted through the network 110 to developers 112 for analysis and correction of the bugs in the program. Conversely, the developers may conduct the testing and the analysis themselves and, hence, correction could be done at their workstation. In some instances, the data race log 130 may be analyzed by an online data race detector executing concurrently on a spare processor core in a many core processor, or a postmortem analysis could analyze the data race log and find the data races. The embodiments described herein focus on the postmortem analysis approach, although it is to be appreciated that the data race log could be analyzed in a plurality of other manners.

The adaptive sampling technique includes locating threads during execution of a multi-threaded program and identifying thread-specific hot paths, thread-specific cold paths and lockset paths during execution of the program. Once these paths are identified, they are sampled and a data race log is generated for a developer to use for correction. This adaptive sampling technique is designed to provide the user with flexibility depending on the desired accuracy and the availability of resources. Thus, thread-specific hot paths and thread-specific cold paths and lockset paths are identified. Previous techniques analyzed 100% of the memory accesses that occurred during execution of the program. This enhanced accuracy but was very detrimental in terms of resources since memory accesses occur very frequently throughout the execution of the program and the resulting data race log can get extremely large. As such, the generation of the data race log becomes resource intensive as does the storage of the data race log. Therefore, the various paths are identified to aid in sampling at various rates, thereby decreasing the resources need to create and store the data race log.

The sampling techniques described herein operate at the granularity of a code region, which generally comprises a loop body or a function. When a code region is sampled, the memory operations executed in the code region are recorded. The proposed samplers are based on the observation that, in well tested programs, a data race is likely to occur when the context of the program is cold, i.e. used infrequently. The intuition here is that in a well-tested program, the data race bugs in the hot contexts would have manifested during the test runs and would have been already fixed. Therefore, a sampler that adaptively decreases the sampling rate for the hot contexts is contemplated in some embodiments.

A cold context or thread-specific cold path can be defined in a number of ways, depending on the accuracy desired. For instance, if a program accesses the thread-specific cold path less than a pre-determined number of times (e.g., one, five, ten, fifty, etc.), it is classified as a cold path. In some instances, there is no time requirement for determining the pre-determined number of times that a path is accessed and classified as either a hot path or a cold path. In some instances, cold paths are sampled more frequently than are hot paths. Furthermore, in some instances, cold paths are substantially sampled (e.g., 50% of the time, 85% of the time, 100% of the time) for a couple of reasons. First, relatively few thread-specific cold paths exist and the amount of resources used to sample these relative few thread-specific cold paths is not prohibitive. Second, in many instances it is more like that a thread-specific cold path will contain a bug that has not yet been discovered as compared to the likelihood that a thread-specific hot path will. Again, this is often true because thread-specific code paths are used less frequently that thread-specific hot paths and, as such, have likely not been tested to the same degree as thread-specific hot-paths.

Conversely, a hot context or thread-specific hot path is generally defined in the current embodiment as a thread that is accessed by the program more than a predetermined number of times (e.g. one, five, ten, fifty, etc.). In other words, the thread is accessed more frequently than compared to thread-specific cold paths. The pre-determined number of times a path is accessed for classification as a hot path or a cold path may be adjusted depending again on the resources available and the accuracy desired, but greater than 10 times generally provides a good sampling parameter. Again, the amount of time required to reach the greater than 10 times parameter is irrelevant in some instances. In other instances, the predetermined number of times should occur within a predetermined amount of time in order for a path to be considered hot.

In certain instances, thread-specific hot paths are sampled at a rate that is less than the rate at which cold paths are sampled. In instances where cold-paths are sampled 100% of the time, for instance, thread-specific hot paths may be sampled less than 100% of the time. Since thread-specific hot paths are used frequently by the program, the probability that thread-specific hot paths contain bugs is significantly decreased. The sampling rate that is used again depends on the resources available and the accuracy desired. Testing has shown that a sampling rate of 0.1% provides a generally acceptable accuracy and significantly reduces resource requirements. Of course, in other instances, any other fixed or variable sampling rate may be used, such as 0.01%, 1%, 10%, 50%, and the like.

Thread-specific paths (both hot and cold) are determined during execution of a program in conjunction with parameters to ascertain the specific thread to which the path is attached. Previous uses of hot and cold paths have centered on code-specific uses, rather than thread-specific uses.

Lockset paths are slightly different than hot paths and cold paths, however, they can be used in conjunction with the thread-specific hot paths and thread-specific cold paths to further enhance accuracy. Lockset paths occur when a program is attempting to access the same location with a different set of locks. With lockset paths, the context of the execution of a path is considered in addition to its frequency of use. For instance, envision that a program wants to access a web page. One aspect of the program may want to access content and may use one set of locks. Another aspect of the program may want to access a button and may use another set of locks. In this instance, both of the portions of the program are accessing the same web page, but these portions are using different locks to do so. This generally raises a concern regarding whether the program is trying to illegally access an area. Because of this concern, these lockset paths may be sampled at a relatively high rate. For instance, these paths may sampled more that thread-specific hot paths. In some instances, these lockset paths are sampled substantially, similar to the sampling rate applied to cold-specific paths. Again, this sampling rate may be 100% in some instances, although lesser sampling rates may also be used, as discussed above with regards to thread-specific cold paths. In some instances, different parameters can be set depending on whether the conflicting locks within the lockset paths are known ahead of time and therefore, may not need to be sampled.

In addition to the above sampling optimizations, other techniques can be used in conjunction with this technique to further reduce resource overhead. For example, it is very unlikely that a stack access will participate in a data race. Hence, in addition to optimizing the logging using the thread-specific hot paths, thread-specific cold paths and the lockset paths, when a code region is chosen to be profiled, a memory operation may only need to be logged if its effective address falls within the stack region. Otherwise, this memory operation is not logged in some instances.

While the description above has centered on computing device 104 operating the data race engine 122 and the data race log 130 being transmitted to the developers 112 for corrective action, other embodiments may also be contemplated. For instance, the entire process may be conducted on servers 106 or servers 108 and then transmitted to the developers 112 for corrective action and analysis. Servers 108 may also be used to backup the information generated to create a redundancy and insure that the information will not be lost.

Illustrative Graphical Diagram

Figure 2:
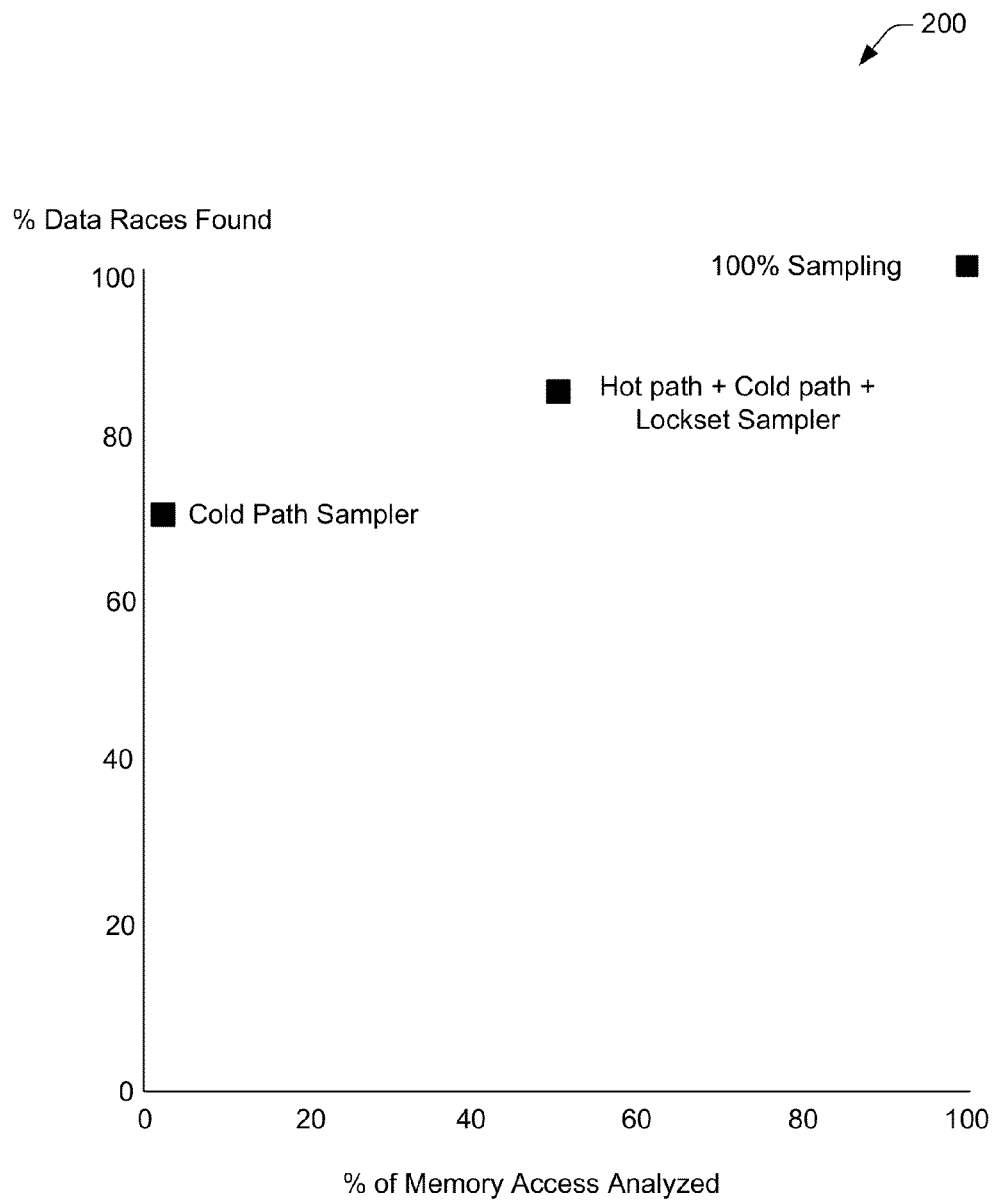
FIG. 2 depicts a graphical illustration demonstrating the effectiveness of the adaptive sampling technique.

FIG. 2 graphically illustrates the benefits of implementing the adaptive sampling techniques described above. The upper right hand corner of the graph illustrates 100% sampling techniques for data race detection. That is, this portion illustrates the results if all code paths are sampled all of the time. In this illustration, 100% of memory access is analyzed and, not surprisingly, 100% of the data races are found. However, this high degree of accuracy comes at a cost in the form of a great deal of resources used to analyze all of the memory accesses. The adaptive sampling techniques, meanwhile, uses fewer resources and can be adjusted depending on the accuracy required and resources available. For example, the cold path sampler data point on the graph illustrates the results with 100% sampling of the thread-specific cold paths. With 100% of the thread-specific cold paths sampled and no thread-specific hot paths sampled, approximately 70% of the data races are found in some instances. Furthermore, because this data point represents only the sampling of cold paths, the resources needed to achieve a 70% detection rate is much lower than when compared to sampling all paths.

The third data point, situated between the first two data point, represents a combination of thread-specific cold path sampling and thread-specific hot path sampling. More specifically, this data point represents sampling the thread-specific cold paths at a first sampling rate and the thread-specific hot paths at a second sampling that is different and possibly lesser than the first sampling rate. In this particular instance, 100% of the thread-specific cold paths are sampled and a smaller than 100% portion of the thread-specific hot paths are sampled. The percentage of the thread-specific hot paths can be adjusted depending on the target accuracy to be attained. In the data point shown, a small percentage, such as 0.1% of the thread-specific hot paths is sampled and the result is that 85% of the data races are found. At the same time, only 50% of the memory access is analyzed. Consequently, accuracy is improved and only half of the resources needed to generate the data race log are required as compared to traditional techniques.

The sampling rates for the thread-specific hot paths, thread-specific cold paths and lockset paths have been described above categorically. In other words, a sampling rate for each path was discussed separately. For example, all hot paths are sampled at 0.1% and all cold paths are sampled at 100%. However, it is also possible that the two paths may be sampled along a continuous or semi-continuous spectrum depending on the hot/cold nature. For instance, one path in a thread may be sampled at a rate of 0.12234% and another path sampled at a rate of 0.23221%. This type of approach is useful when a pre-determined value for what determines a hot path and what determines a cold path in a thread is not definitive. If it is determined that the probability that a particular path may contain program errors is increased over what is typically determined to be a hot path but does not rise to the risk level of a cold path, it may be determined that a rate of 0.23221% for this path would provide the accuracy required at the resource level available. It may be determined that another path provide additional risk and is sampled at 0.36678% and so on to provide a spectrum not shown in the graph in FIG. 2 instead of an actual data point as is currently depicted.

Illustrative Diagram

Figure 3:
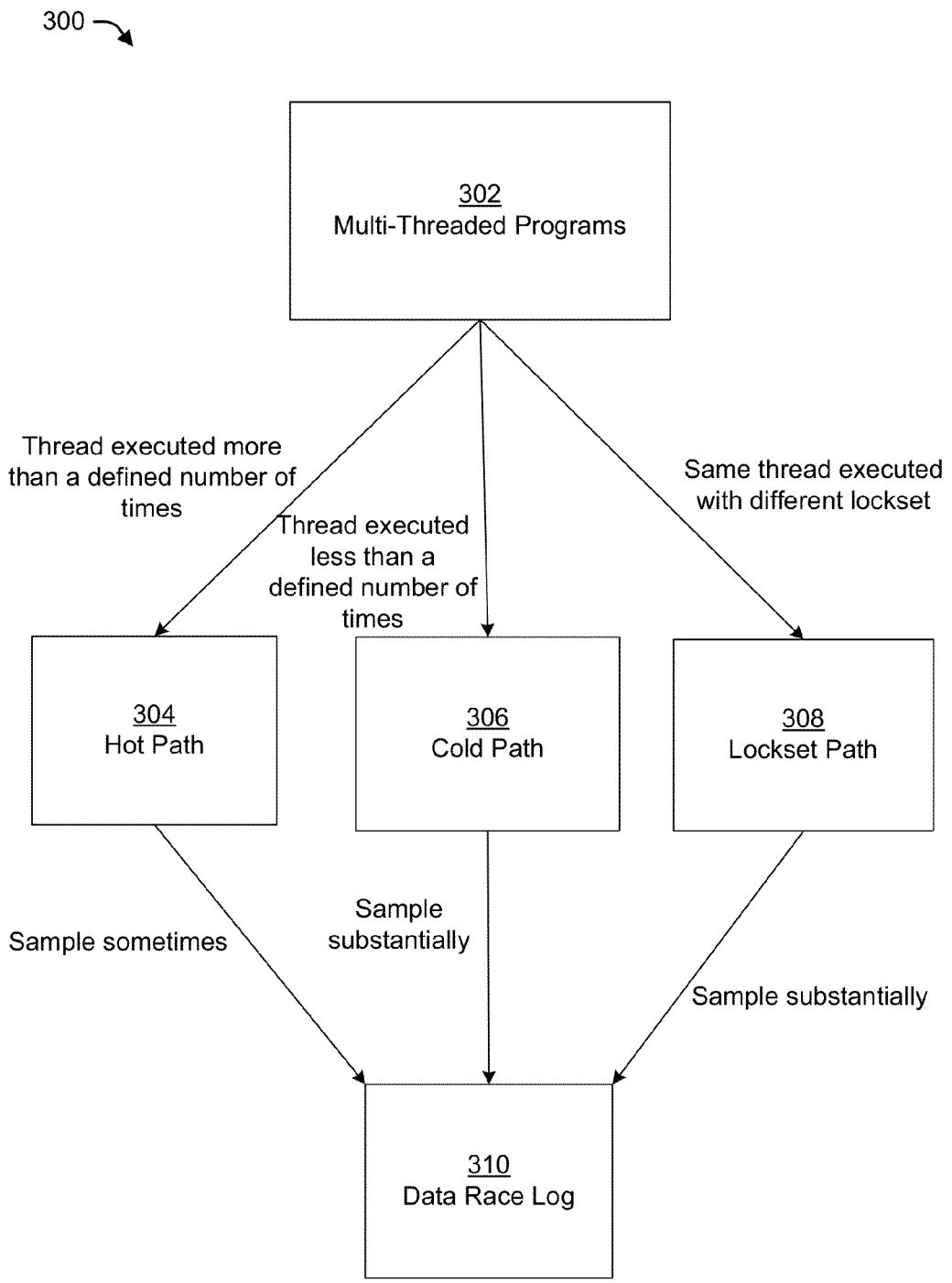
FIG. 3 depicts a diagram of an illustrative process for utilizing the adaptive sampling technique.

FIG. 3 depicts a diagram for utilizing the adaptive sampling technique. Process 300 is illustrated as a diagram which represents a sequence of operations that can be implemented in hardware, software, or a combination thereof. In the context of software, the operations represent computer-executable instructions that, when executed by one or more processors, perform the recited operations. Generally, computer-executable instructions include routines, programs, objects, components, data structures, and the like that perform particular functions or implement particular abstract data types.

Process 300 represents illustrative operations used to detect data races using adaptive sampling techniques. To begin, one or more multi-threaded programs 302 are operating. At this point, thread-specific hot paths 304, thread-specific cold paths 306 and lockset paths 308 (or any combination thereof) are identified using parameters that may be set by the user or preset by the organization. As discussed above, when a thread accesses memory or is executed more than a defined number of times, the path is identified as a thread-specific hot path 304. Conversely, when a thread accesses memory or is executed less than a defined number of times, the path is identified as a thread-specific cold path 306. Finally, when the same thread is executed multiple times with a different lockset each time, the path is identified as a lockset path 308.

Once the paths have been identified, the paths are sampled. As shown in FIG. 3, the thread-specific hot paths 304 are typically sampled a first sampling rate. They may be sampled anywhere between 0% and 100% depending on the accuracy desired and the resources available, however, one illustrative sampling rate is approximately 0.1% to obtain a reasonable accuracy with a minimum amount of resources being required.

The thread-specific cold paths 306 are usually sampled at a second sampling rate that, in some instances, is different than the first sampling rate. For instance, these paths may be sampled more than the thread-specific hot paths and, as such, may be substantially sampled. While the thread-specific cold paths 306 may also be sampled between 0% and 100%, in one illustrative embodiment the thread-specific cold paths 306 are sampled approximately 100% of the time. The main reason for 100% sampling is the increased accuracy with little increase in the need for resources. By definition, the thread-specific cold paths 306 do not occur as often as the thread-specific hot paths 304 and therefore, relatively less sampling may occur despite the substantially higher sampling rate. At the same time, since the thread-specific cold paths are executed less frequently, there is a greater probability that undiscovered bugs will reside in the thread-specific cold paths 306 as opposed to the thread-specific hot paths 304. Since the thread-specific hot paths 304 are executed frequently, presumably any bugs would typically be discovered earlier.

Lockset paths 308, meanwhile, may be sampled at yet a third sampling rate. The third sampling rate may different from one or both of the first and second sampling rates, or the third sampling rate may be same as one or both of the first and second rates. In a similar manner to the thread-specific cold paths 306, lockset paths 308 typically occur less frequently than the thread-specific hot paths 304 and therefore, require fewer resources to sample. Lockset paths 308 may, therefore, be sampled substantially in some instances. For instance, these paths may be sampled 100% of the time due to their less frequent occurrence, although, again, they can also be sampled anywhere between 0% and 100%.

After the thread-specific hot paths 304, the thread-specific cold paths 306 and the lockset paths 308 have been identified and sampled, information from each of the sampled paths is recorded in a data race log 310. The data race log 310 may be used for troubleshooting and corrective action by the developers 112 illustrated in FIG. 1 or otherwise.

Illustrative Processes

Figure 4:
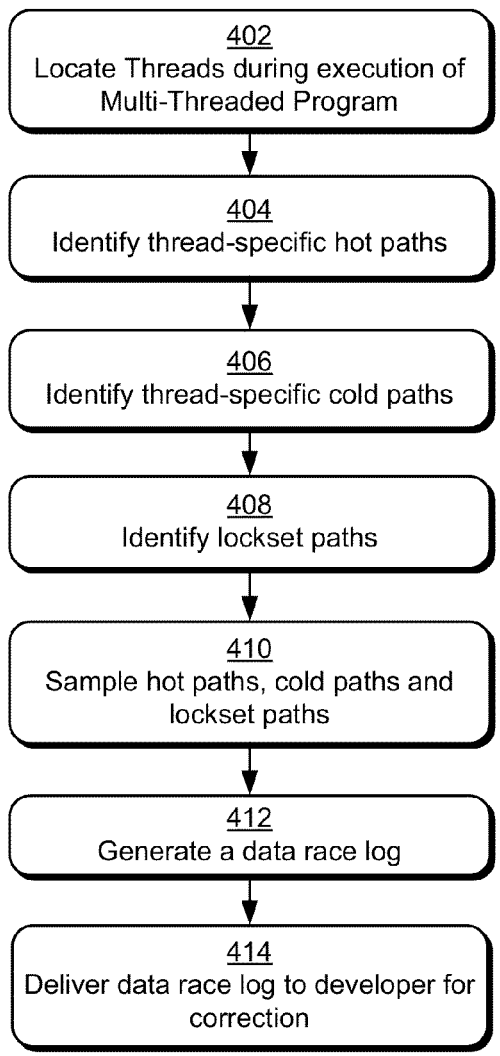
FIGS. 4-5 depict illustrative processes employed by a dynamic data-race detector using adaptive sampling techniques.
Figure 5:
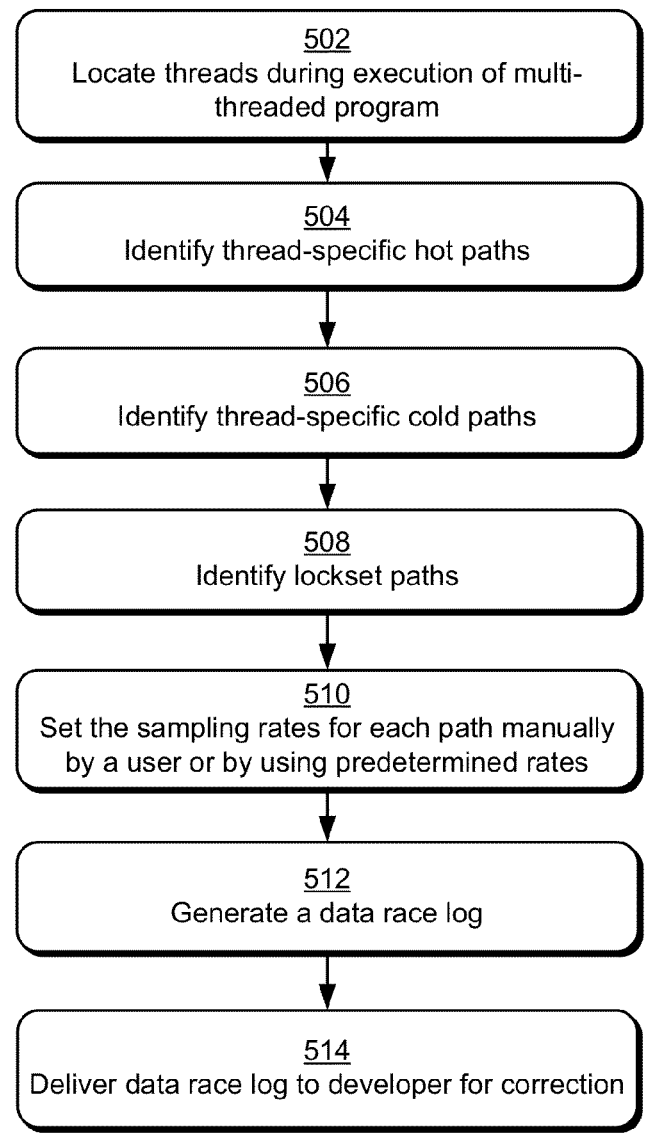

FIGS. 4-5 depict illustrative processes for detecting data races using dynamic adaptive sampling techniques and may be implemented by the architecture of FIG. 1 and/or by other architectures. These processes are each illustrated as a collection of blocks in a logical flow graph, which represent a sequence of operations that can be implemented in hardware, software, or a combination thereof. In the context of software, the blocks represent computer executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

Process 400 includes operation 402 where threads in a multi-threaded program are located during execution of the multi-threaded program. Threads are typically identified in all places where memory is accessed during execution of the multi-threaded program. In a typical program, memory is accessed a significant number of times. Operation 402 identifies the thread-specific hot paths. As described above, the thread-specific hot paths are executed more frequently. Operation 404 identifies the thread-specific cold paths. Conversely, as described above, the thread-specific cold paths are executed less frequently. Operation 406 identifies the lockset paths.

Operation 410 then samples the thread-specific hot paths, the thread-specific cold paths and the lockset paths according to a defined sampling rate for each path. Operation 412 generates a data race log containing memory operations and synchronization operations. Finally, in operation 414, the data race log is delivered to the developer for analysis and corrective action. The corrective action includes revising code within the multi-threaded program to eliminate bugs and identified problems in the data race log.

Process 500 includes operation 502 for locating threads during execution of a multi-threaded program. Operation 504 identifies the thread-specific hot paths and operation 506 identifies the thread-specific cold paths while operation 508 identifies the lockset paths.

Operation 510 sets the sampling rate for each path. Each of the paths may be set manually by the user or conversely, each of the paths can be set to a predetermined rate. It is also possible that a user may want to manually set a sampling rate for one or more of the paths and allow the predetermined rate to remain set for any remaining paths. Thus, the sampling rate determination is versatile such that each of the paths may be set manually or at a predetermined rate in any combination between the paths.

Operation 512 generates a data race log and operation 514 delivers the data race log to the developer for correction.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. Computer readable memory having stored thereon computer executable instructions executable by a computer to perform a process comprising:

locating multiple threads during execution of a multi-threaded program;

identifying one or more thread-specific cold paths, one or more thread-specific lockset paths and one or more thread-specific hot paths from the multiple located threads, wherein:
the one or more thread-specific cold paths indicate that one or more first threads are accessed or executed less than a first predetermined number of times,
the one or more thread-specific hot paths indicate that one or more second threads are accessed or executed more than a second predetermined number of time, and
the one or more thread-specific lockset paths indicate that one or more third threads are accessed using different locks;
sampling: (i) the one or more thread-specific cold paths at a first rate; (ii) the one or more thread-specific lockset paths at a second rate, and (iii) the one or more thread specific hot paths at a third rate that is less than both the first and second rates; and
generating a data-race log that includes information determined during the sampling of the one or more thread-specific cold paths, the one or more thread-specific lockset paths, and the one or more thread-specific hot paths.

2. The computer readable memory according to claim 1, wherein the first rate, the second rate and the third rate are determined by a user.

3. The computer readable memory according to claim 1, wherein the first and second rates are greater than 90% and the third rate is less than 1%.

4. The computer readable memory according to claim 1, wherein the one or more thread-specific hot paths are identified when a code within the one or more threads has been executed more than ten times.

5. The computer readable memory according to claim 1, wherein the one or more thread-specific cold paths, the one or more thread-specific hot paths and the one or more lockset paths are determined during execution of the program.

6. The computer readable memory according to claim 1, wherein the data race log is made available to a developer for correction of the one or more threads.

7. The computer readable memory according to claim 1, wherein the generation of the data race log includes logging memory operations and synchronization operations associated with the sampling of the one or more thread-specific cold paths, the one or more thread-specific hot paths and the one or more lockset paths.

8. The computer readable memory according to claim 7, wherein each of the logged memory operations includes a program counter of the memory operation and an effective address of the logged memory operation.

9. The computer readable memory according to claim 7, wherein each of the logged synchronization operations includes a global timestamp which specifies a chronological order between the logged synchronization operations executed for the one or more threads.

10. Computer readable memory having stored thereon computer executable instructions executable by a computer to perform a process comprising:
locating multiple threads during execution of a multi-threaded program;
identifying a first set of one or more thread-specific paths and a second set of one or more thread-specific paths in the multi-threaded program, wherein:
the first set of one or more thread-specific paths indicate that one or more first threads are accessed or executed less than a first predetermined number of times, and
the second set of one or more thread-specific paths indicate that one or more second threads are accessed or executed more than a second predetermined number of times;
sampling the first set of one or more thread-specific paths in the multi-threaded program at a first sampling rate and the second set of one or more thread-specific paths at a second sampling rate that is different than the first sampling rate; and
generating a data race log from sampled one or more thread-specific paths in the multi-threaded program.

11. The computer readable memory according to claim 10, wherein the first sampling rate is applied to a cold path and the second sampling rate is applied to a hot path.

12. The computer readable memory according to claim 11, wherein the first sampling rate for the cold path is less than the second sampling rate for the hot path.

13. The computer readable memory according to claim 10, wherein the one or more thread-specific paths in the multi-threaded program is determined during execution of the multi-threaded program.

14. The computer readable memory according to claim 10, wherein the generation of the data race log includes logging memory operations and synchronization operations for each sampled thread.

15. A method for detecting one or more data races in multi-threaded programs, the method comprising:
under control of one or more computing devices comprising one or more processors,
locating multiple threads during execution of the multi-threaded programs;
identifying one or more thread-specific hot paths and one or more thread-specific cold paths from the multiple threads, wherein:
the one or more thread-specific cold paths indicate that one or more first threads are accessed or executed less than a first predetermined number of times, and
the one or more thread-specific hot paths indicate that one or more second threads are accessed or executed more than a second predetermined number of times;
sampling one or more thread-specific cold paths at a first rate and one or more thread-specific hot paths at a second rate that is different from the first rate; and
generating a data-race log that includes information of respective times of synchronization operations and memory operations that are executed by the sampled one or more thread-specific cold paths and the one or more thread-specific hot paths.

16. The method according to claim 15, wherein the first rate and the second rate are determined by a user.

17. The method according to claim 15, wherein the first rate is greater than 90% and the second rate is less than 1%.

18. The method according to claim 15, wherein the one or more cold paths and the one or more hot paths are determined during execution of the program.

* * * * *